United States Patent
Wang et al.

(10) Patent No.: US 6,636,682 B2
(45) Date of Patent: Oct. 21, 2003

(54) VARIABLE OPTICAL ATTENUATOR HAVING INTEGRATED REFLECTIVE DEVICE

(75) Inventors: Chung-Chih Wang, Tu-Chen (TW); Yao-Hao Chang, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/041,076

(22) Filed: Dec. 28, 2001

(65) Prior Publication Data

US 2003/0081927 A1 May 1, 2003

(30) Foreign Application Priority Data

Oct. 31, 2001 (TW) ........................................ 90218615 U

(51) Int. Cl.$^7$ .................................................. G02B 6/00
(52) U.S. Cl. ........................................ 385/140; 385/140
(58) Field of Search ......................... 385/140, 15, 19, 385/25, 31, 36, 14

(56) References Cited

U.S. PATENT DOCUMENTS 6,157,455 A * 12/2000 Pinvidic et al. ............. 356/437
6,292,616 B1 * 9/2001 Tei et al. .................... 385/140
6,442,324 B2 * 8/2002 Tei et al. .................... 385/140
2002/0085827 A1 * 7/2002 Shi et al. .................... 385/140
2003/0049011 A1 * 3/2003 Chang ........................ 385/140
2003/0086678 A1 * 5/2003 Chang ........................ 385/140

\* cited by examiner

Primary Examiner—Brian Healy
Assistant Examiner—Daniel Valencia
(74) Attorney, Agent, or Firm—Wei Te Chung

(57) ABSTRACT

An electrical variable optical attenuator includes a housing (1), a cover (2), an optical module (3), and a shifting device (4). The optical module comprises a reflective device (31), a graded transmittance filter (32), a filter carrier (33), and a container (38). The reflective device is an integrated piece comprising a first reflective plane (311), a second reflective plane (312), and an opening (313) movably accommodating the graded transmittance filter therein. The first and the second reflective planes are substantially perpendicular to each other. Because the first and second reflective planes are integrally formed on the reflective device, the attenuator is relatively easy to assemble. In addition, the attenuator is able to operate reliably in rugged conditions, including applications where the attenuator may be subjected to vibration, shock or extreme temperatures.

14 Claims, 6 Drawing Sheets

VARIABLE OPTICAL ATTENUATOR HAVING INTEGRATED REFLECTIVE DEVICE

BACKGROUND OF THE INVENTION

1. Field of the Invention

The present invention relates to a variable optical attenuator, and particularly to an electrical variable optical attenuator having an integrated reflective device.

2. Description of Prior Art

Optical attenuators are widely used in optical transmission systems and optical networks. There are essentially two kinds of optical attenuators, variable and invariable. A variable optical attenuator is a passive optical component used to reduce optical power propagating in an optical fiber and to adjustably provide a range of amounts of attenuation. An invariable optical attenuator provides only one fixed setting of attenuation. Variable optical attenuators may be categorized as either electrical or manual. An electrical variable optical attenuator comprises an electrical controlling cell. Electrical variable optical attenuators are more widely used in optical transmission systems and optical networks, because they are more precise than manual variable optical attenuators.

A typical variable optical attenuator comprises a reflective mirror group having at least two independent reflective mirrors that form a light circuit.

Referring to FIG. 6, U.S. Pat. No. 6,292,616 discloses a variable optical attenuator comprising a U-frame, an attenuator plate 10, two independent mirrors 4, 5, two collimators 7, 8 and two optical fibers 6, 9. The U-frame is formed by folding a tubular member. A central axis of the U-frame is the optical axis of the attenuator. The attenuator plate 10 is disposed between the two mirrors 4, 5 in a central part of the U-frame.

Unfortunately, conventional variable optical attenuators such as that disclosed in U.S. Pat. No. 6,292,616 require very precise positioning of numerous optical components such as mirrors therein. This results in unduly high manufacturing and assembly costs. In addition, if optical components are imprecisely collimated, this often results in even more magnified imprecision in the amount of attenuation obtained. Thus the problem of unduly high manufacturing and assembly costs is exacerbated. Furthermore, if the conventional attenuator is subjected to vibration or shock during ordinary use, its mirrors are prone to shift position. This decreases the precision of attenuation.

SUMMARY OF THE PRESENT INVENTION

Accordingly, an object of the present invention is to provide a variable optical attenuator which is easy to assemble.

Another object of the present invention is to provide a variable optical attenuator which ensures precise collimation of optical components therein.

A further object of the present invention is to provide a robust variable optical attenuator which resists vibration and shock.

To achieve the above objects, an electrical variable optical attenuator in accordance with the present invention comprises a housing, a cover, an optical module and a shifting device. The optical module comprises a reflective device, a graded transmittance filter, a filter carrier, and a container. The reflective device is an integrated piece comprising a first reflective plane, a second reflective plane, and an opening movably accommodating the graded transmittance filter therein. The first and the second reflective planes are substantially perpendicular to each other. Because the first and second reflective planes are integrally formed on the reflective device, the attenuator is relatively easy to assemble. In addition, the attenuator is able to operate reliably in rugged conditions, including applications where the attenuator may be subjected to vibration, shock or extreme temperatures.

Other objects, advantages and novel features of the invention will become more apparent from the following detailed description when taken in conjunction with the accompanying drawings, in which:

DETAILED DESCRIPTION OF PREFERRED EMBODIMENT OF THE PRESENT INVENTION

Figure 1:
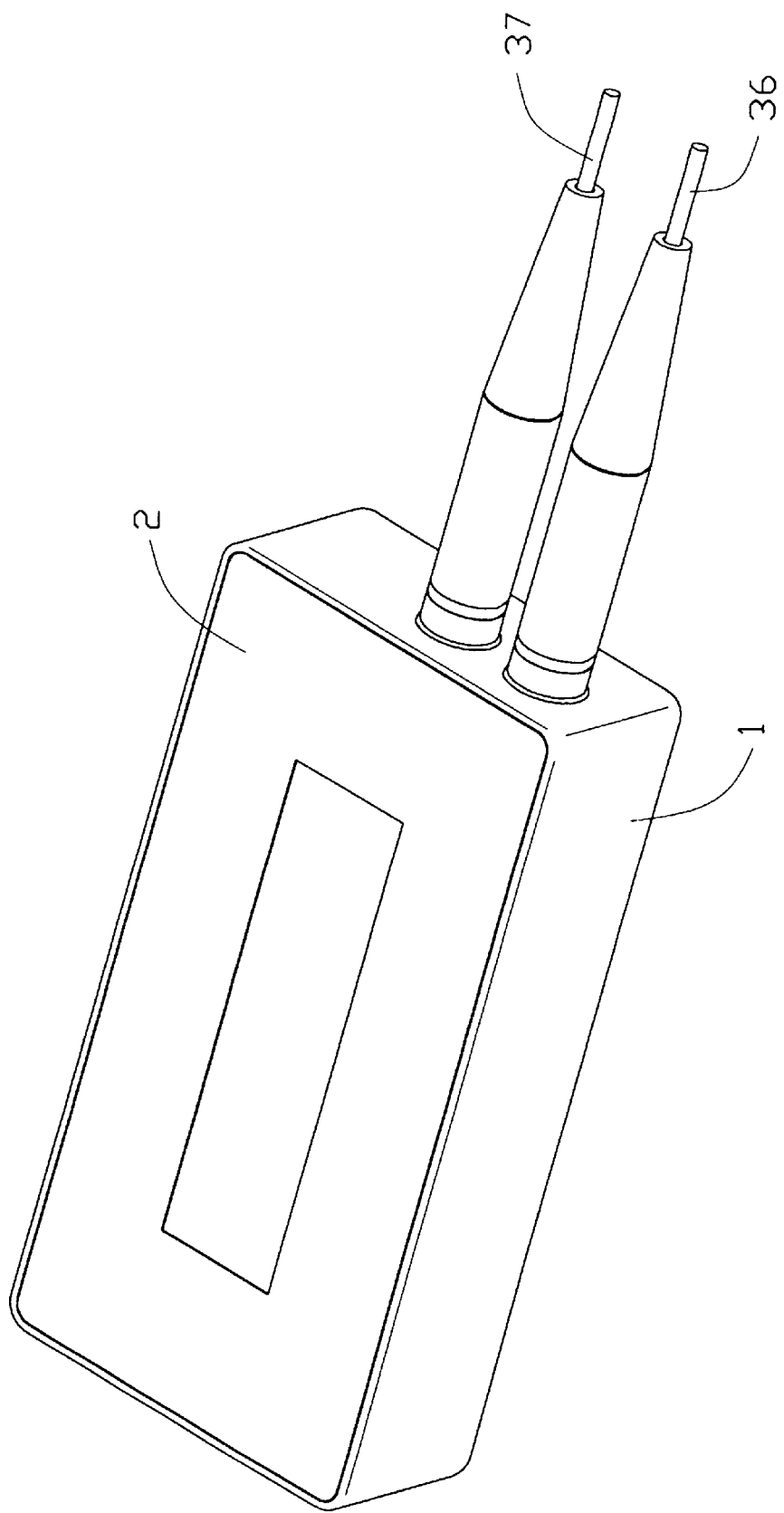
FIG. 1 is a perspective view of an electrical variable optical attenuator in accordance with the present invention.
Figure 2:
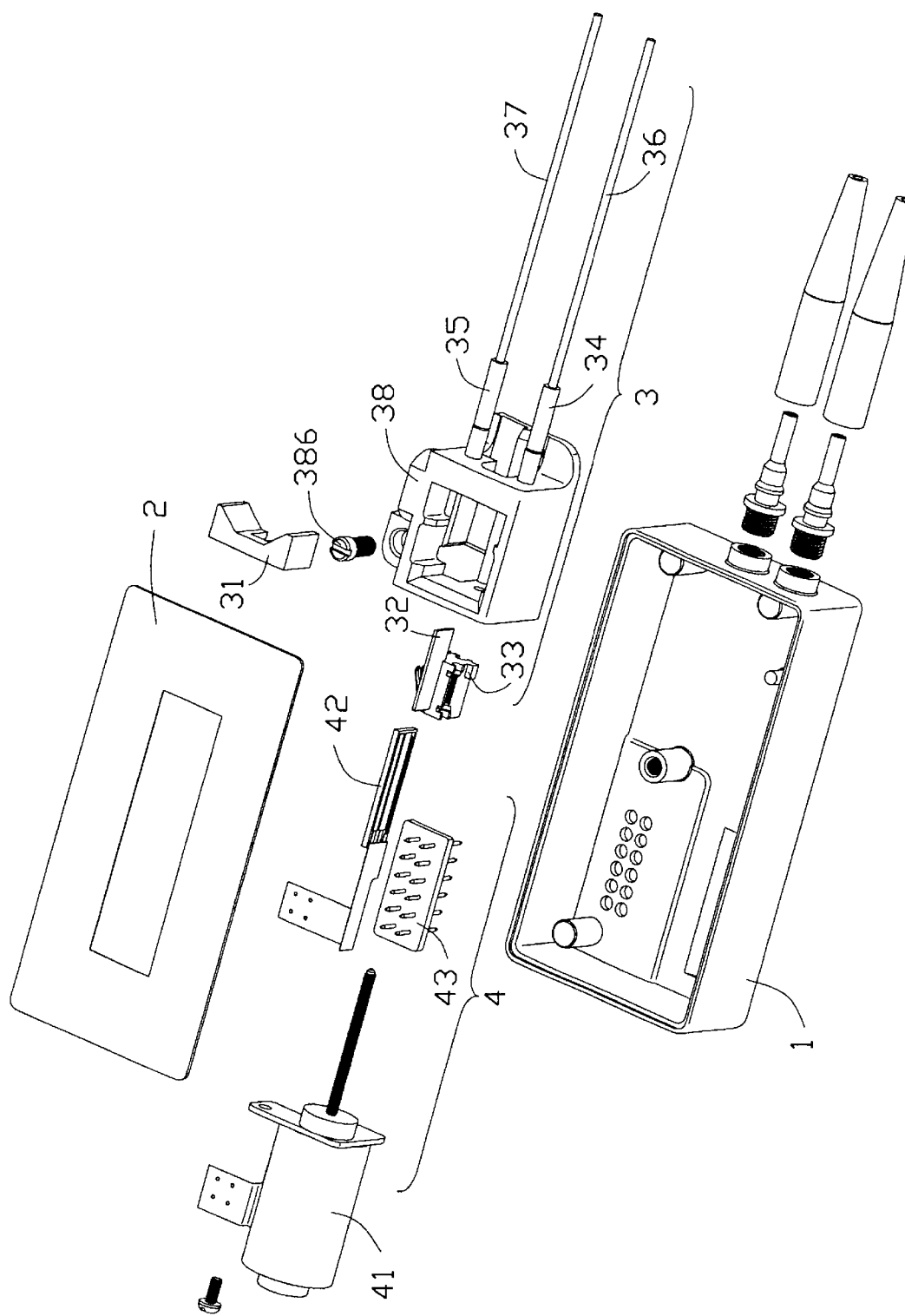
FIG. 2 is an exploded view of the attenuator of the FIG. 1.
Figure 3:
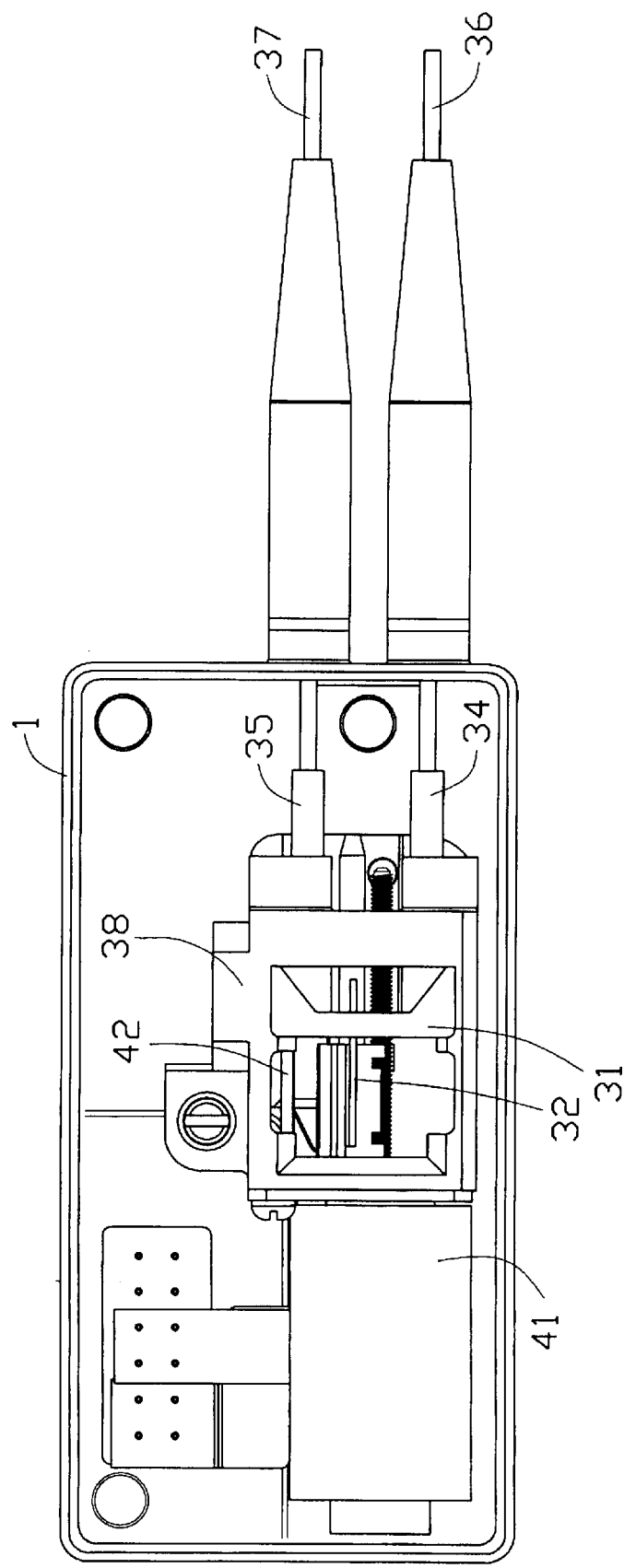
FIG. 3 is a top plan view of the attenuator of FIG. 1, with a cover thereof removed to show internal components.

Referring to FIG. 1, an electrical variable optical attenuator in accordance with the present invention comprises a housing 1 and a cover 2. The housing 1 and cover 2 cooperatively define a space therebetween to encase and protect internal components. An input optical fiber 36 inputs optical signals into the attenuator. After being attenuated, the optical signals are output through an output optical fiber 37. Referring to FIGS. 2 and 3, the attenuator further comprises an optical module 3 and a shifting device 4.

Figure 4:
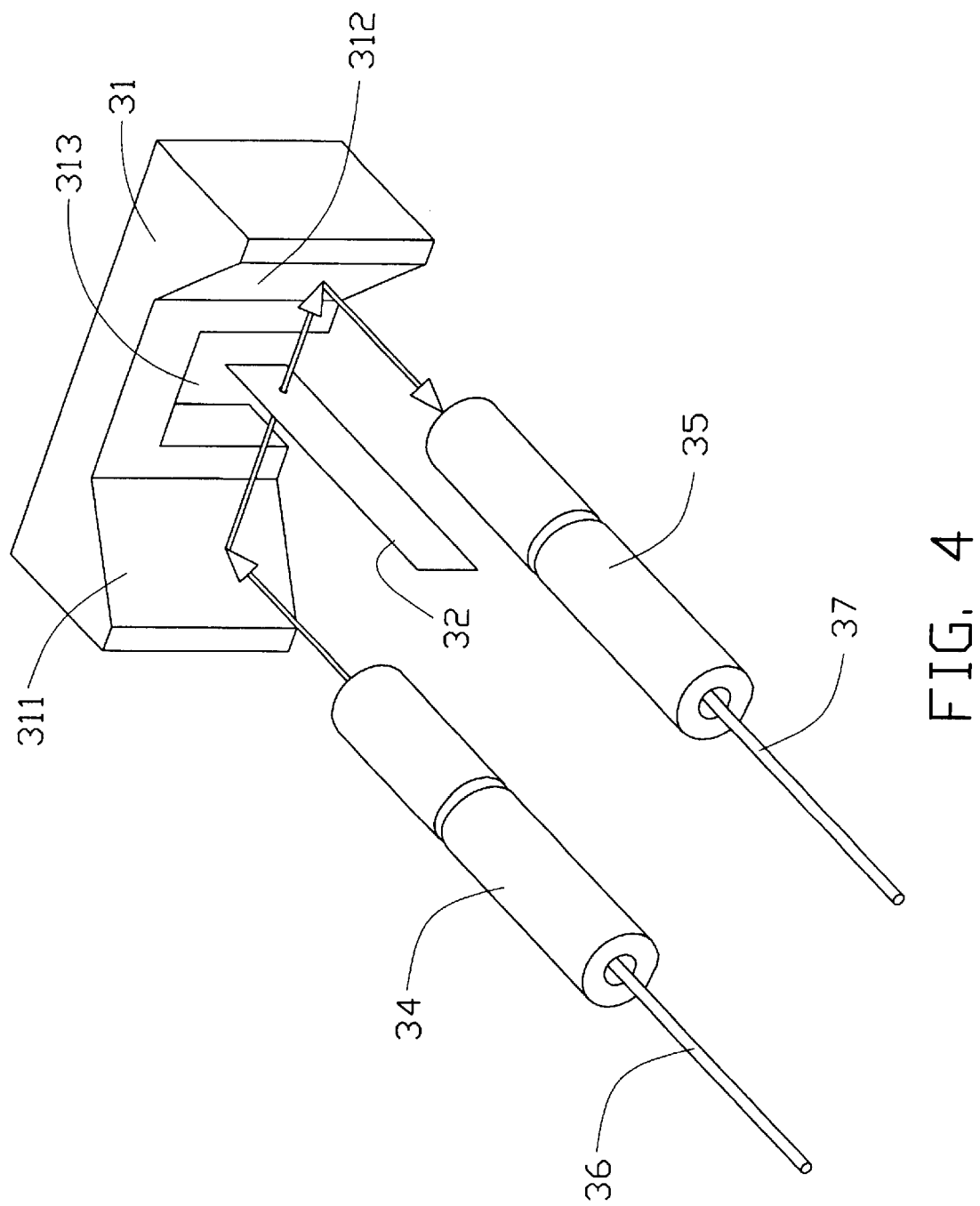
FIG. 4 is a schematic perspective diagram of a reflective device and an optical circuit of the attenuator of FIG. 1.

Referring to FIG. 4, the optical module 3 comprises a reflective device 31, a graded transmittance filter 32, a filter carrier 33 supporting the graded transmittance filter 32, input and output optical fiber collimators 34, 35, the optical fibers 36, 37 and a container 38. The reflective device 31, graded transmittance filter 32, filter carrier 33, input and output optical fiber collimators 34, 35 and optical fibers 36, 37 cooperatively form an optical circuit. The container 38 retains the reflective device 31, the graded transmittance filter 32 and the filter carrier 33 therein.

Referring to FIG. 4, the reflective device 31 is an integrated piece comprising a first reflective plane 311, a second reflective plane 312, and an opening 313 movably accommodating the graded transmittance filter 32 therein. The first reflective plane 311 and the second reflective plane 312 are substantially perpendicular to each other. The reflective device 31 is made of material such as optical glass, optical plastic or optical crystal. The first and second reflective planes 311, 312 may further comprise at least one layer of reflective film deposited thereon. The reflective film has high reflectance of light wavelengths within a spectral range for optical communications. The graded transmittance filter 32 has a gradient distribution of variable transmittance from one end thereof through to an opposite end thereof. Thus a desired amount of light attenuation can be obtained by adjusting a position in which the graded transmittance filter 32 is placed across a path of a light beam.

Figure 5:
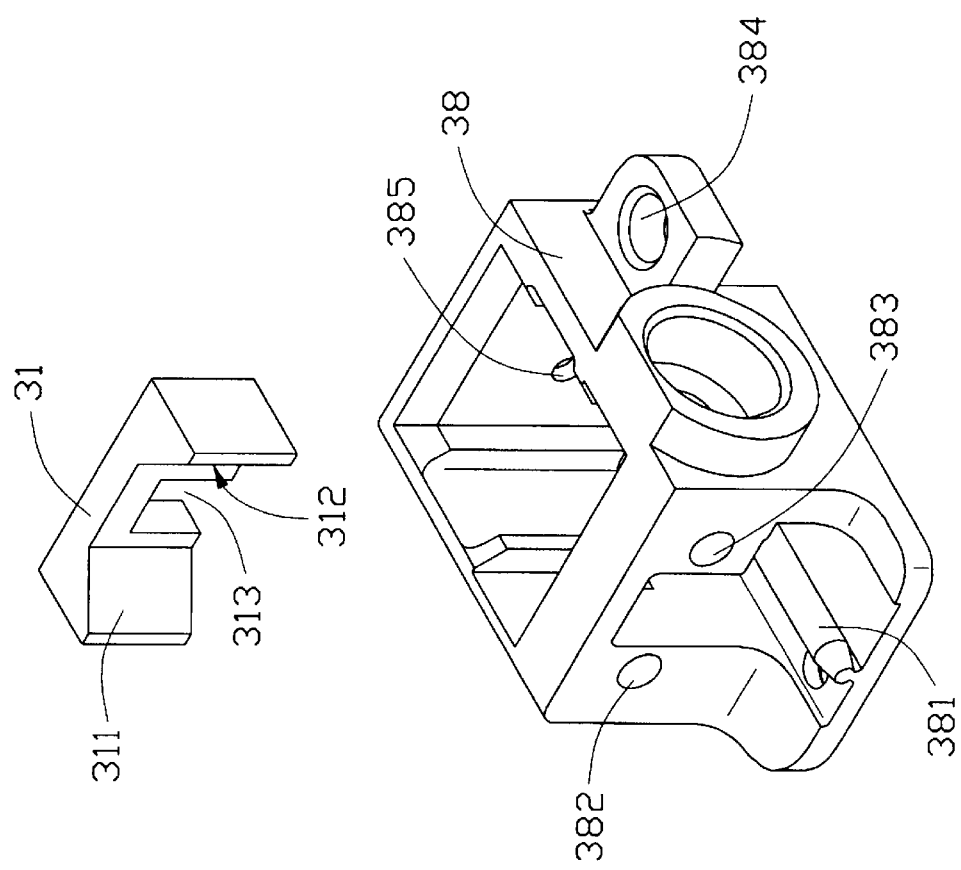
FIG. 5 is an exploded perspective view of a reflective device and a container of the attenuator of FIG. 1.
Figure 6:
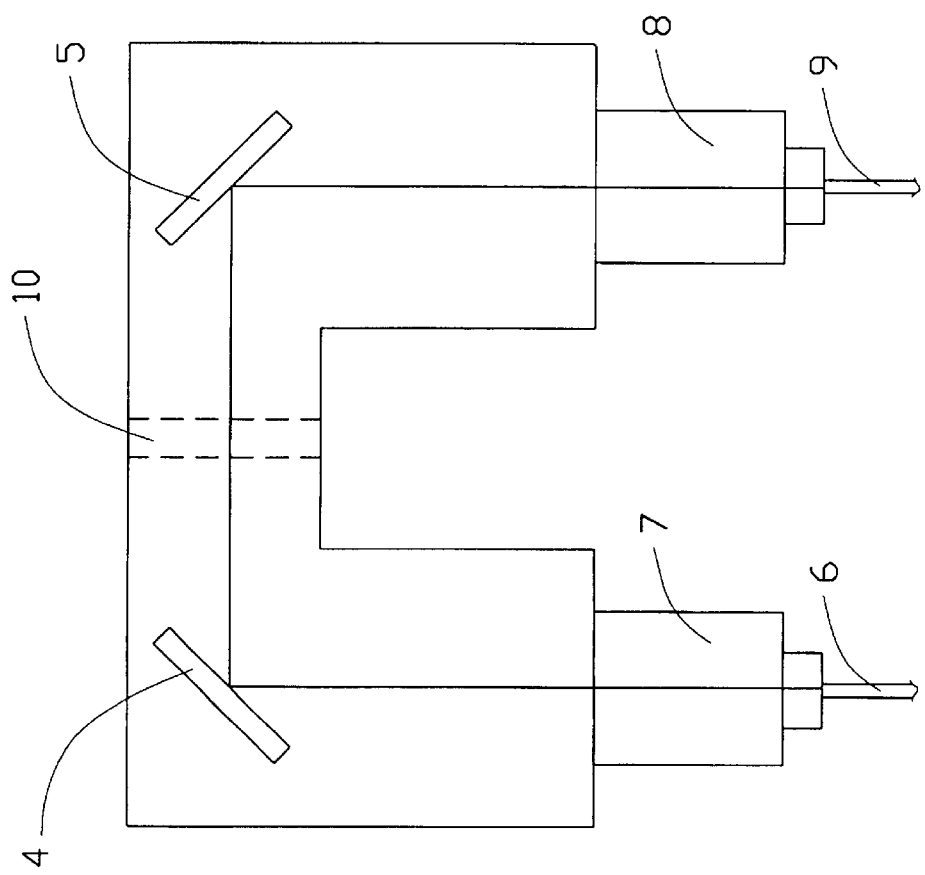
FIG. 6 is a schematic top plan view of a conventional variable optical attenuator.

Referring to FIG. 5, the reflective device 31 is fixed in the container 38. The container 38 can movably accommodate the graded transmittance filter 32 and the filter carrier 33 therein. The container 38 comprises a guide rail 381, two holding apertures 382, 383, a locating hole 384 and a through hole 385. The guide rail 381 is formed on a front portion of a base of the container 38. The holding apertures 382, 383 are defined in opposite sides of a front wall of the container 38. The locating hole 384 is defined in a protrusion formed on an outside of one sidewall of the container 38. The through hole 385 is defined in a rear wall of the container 38.

The guide rail 381 movably supports the filter carrier 33 thereon. The holding apertures 382, 383 respectively hold the input and output optical fiber collimators 34, 35 therein. The locating hole 384 corresponds with a screw 386 that fastens the optical module 3 in the housing 1. The through hole 385 movably receives a screw pole (not labeled) of the stepping motor 41 therethrough.

Referring to FIGS. 2, 3 and 5, the shifting device 4 comprises a stepping motor 41, an electrical resistor 42 and an electrical connector 43 connecting with a power supply (not shown). The stepping motor 41 functions to drive the filter carrier 33 and graded transmittance filter 32 to shift across a path of a light beam reflected from the first reflective plane 311 of the reflective device 31.

In operation, a light beam passes from the input optical fiber 36 to the input optical fiber collimator 34. The collimated light beam is reflected by the first reflective plane 311. The reflected light beam then passes through the graded transmittance filter 32 to obtain a desired amount of attenuation. The attenuated light beam is reflected by the second reflective plane 312 to the output optical fiber collimator 35. After being collimated, the attenuated light beam is output to the output optical fiber 37. During this process, the electrical resistor 42 senses a position of the graded transmittance filter 32 mounted on the filter carrier 33, and feeds the position back to the stepping motor 41. The stepping motor 41 then drives the filter carrier 33 to shift the graded transmittance filter 32 to a desired position which yields a desired amount of attenuation.

In the present invention, the first and second reflective planes 311, 312 are integrally formed on the reflective device 31. Thus the attenuator of the present invention is able to operate reliably in rugged conditions, including applications where the attenuator may be subjected to vibration, shock or extreme temperatures.

It is to be understood that although the above-described embodiment of the present invention discloses an electrical variable optical attenuator, the principles of the present invention are also applicable to manual variable optical attenuators. Modifications and adaptations of the above-described embodiment may be made to meet particular requirements. The disclosure is intended to exemplify the invention without limiting its scope. All modifications that incorporate the invention disclosed in the preferred embodiment are to be construed as coming within the scope of the appended claims or the range of equivalents to which the claims are entitled.

We claim:

1. A variable optical attenuator comprising:
   a housing;
   a cover;
   an input optical fiber through which optical signals are inputted into said variable optical attenuator;
   an output optical fiber through which optical signals are outputted from said variable optical attenuator;
   a shifting device; and
   an optical module, the optical module comprising a filter, a filter carrier, a reflective device and a container retaining the reflective device therein, the reflective device having at least two reflective planes integrally formed thereon, the container comprising a guide rail; wherein
   the guide rail movably supports the filter carrier thereon.

2. The variable optical attenuator as described in claim 1, wherein the variable optical attenuator is an electrical variable optical attenuator.

3. The variable optical attenuator as described in claim 2, wherein the variable optical attenuator further comprising a stepping motor, an electrical resistor and an electrical connector connecting with a power supply.

4. The variable optical attenuator as described in claim 1, wherein the reflective device as two reflective planes integrally formed thereon.

5. The variable optical attenuator as described in claim 4, wherein the two reflective planes are substantially perpendicular to each other.

6. The variable optical attenuator as described in claim 1, wherein the reflective device defines an opening movably accommodating the filter therein.

7. The variable optical attenuator as described in claim 1, wherein the filter is a graded transmittance filter.

8. The variable optical attenuator as described in claim 1, wherein the container further comprises two holding apertures, a locating hole and through hole.

9. The variable optical attenuator as described in claim 8, wherein the locating hole is defined in a side of the container, and cooperates with a screw to fasten the optical module in the variable optical attenuator.

10. The variable optical attenuator as described in claim 1, wherein the through hole is defined in a wall of the container and movingly receives a screw pole of a stepping motor of the variable optical attenuator therethrough.

11. The variable optical attenuator as described in claim 1, wherein the reflective device is made of material selected from the group consisting of optical glass, optical plastic and optical crystal.

12. The variable optical attenuator as described in claim 1, wherein each of the at least two reflective planes further comprises at least one layer of reflective film deposited thereon.

13. The variable optical attenuator as described in claim 1, wherein the reflective film as high reflectance of light wavelengths within a spectral range for optical communications.

14. An optical module comprising:
   a container defining a receiving cavity;
   a pair of optical fibers side by side arranged with each other installed into the container in a first direction, and commonly facing forwardly;
   a single piece reflecting device installed into the receiving cavity in a second direction perpendicular to said first direction; wherein
   said single piece reflecting device is made of optical material and defines thereof first and second reflective planes tilted relative to each other, at fixed angles, with reflective films directly applied thereon, respectively; wherein
   the container includes a guide rail movably supporting a filter carrier thereon.

* * * * *